Patented Nov. 5, 1946

2,410,431

UNITED STATES PATENT OFFICE 2,410,431

ALKYL MERCAPTO SUBSTITUTED AMINO BENZOIC ACID ALKAMINE AMIDES, SALTS, INTERMEDIATES, AND PROCESS OF PREPARING SAME

John J. Donleavy, Montclair, N. J., assignor to Allied Laboratories, Inc., Kansas City, Mo.

No Drawing. Application April 24, 1943, Serial No. 484,472

5 Claims. (Cl. 260—558)

This invention relates to a newly discovered group of organic compounds which have a local anesthetic action similar to cocaine or procaine and the like.

This application is a continuation-in-part of the co-pending application Serial No. 282,352 filed January 1, 1939 (now Patent No. 2,321,468), and entitled Alkyl thio substituted amino benzoic acid alkamine esters, salts, intermediate and process of preparing same, in turn a continuation-in-part of Patent No. 2,173,827, dated September 26, 1939.

The chief object of this invention is to prepare a compound which has local anesthetic properties equal or greater than that of cocaine, etc., and which has a toxicity equal to or less than that of the last mentioned products, the anesthetic property of the present newly discovered organic compounds being of local character. Specifically the products are amides and comparable to the esters of the application hereinbefore referred to and now allowed.

An amide of the examples hereinafter mentioned was found to have approximately four times the anesthetic power of cocaine although only having a toxicity equal to that of cocaine and to that extent this amide is more suitable for anesthetic purposes than the esters of the co-pending application, which included an example that showed only twice the anesthetic power of cocaine for the best comparable ester product. The products herein of amide character have the general form expressed algebraically as follows:

R'SC$_6$H$_3$(NH$_2$)CONH(CH$_2$)$_x$NR''R''', wherein R' is an alkyl radical, R'' is an alkyl radical and R''' is an alkyl radical and $x$ is an integer greater than the unity and less than 4. In certain instances R'' and R''' may be combined in the form of a polymethylene chain, for example the group NR''R''' may be the piperidyl radical.

Broadly speaking, the product is an amide of an aromatic acid and a dialkyl amino alkyl amine, or is a salt thereof.

Inasmuch as the aforementioned allowed application, now Patent No. 2,321,468, dated September 26, 1939, fully and accurately sets forth in considerable detail the highly desirable characteristics of the general class of products to which that disclosure and the instant disclosure is directed, no further description or explanation is believed necessary.

It may be here briefly stated that the first two processes set forth in the copending application, as originally filed, are processes which followed to a certain point produce intermediates but thereafter the processes are changed herein and there are produced amides having the advantages before mentioned over the esters produced by the process of that co-pending disclosure.

By way of explanation only it is stated that common to the Patent No. 2,173,827, and the co-pending application disclosure, now Patent No. 2,321,468, and the instant application all the products include the introduction of an alkyl mercapto group into molecules previously known to have some anesthetic power, but such introduction in the products of the co-pending application disclosure, now Patent No. 2,321,468, were more desirable for reasons stated therein over the products of the earlier patent and in comparable manner the products of the instant disclosure (the amides, etc.) are more desirable than the esters, etc., set forth in the copending application, now Patent No. 2,321,468.

The formula of this subsequent specific disclosure is set forth as follows for one compound of one series of compounds:

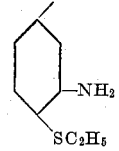

In the series of compounds, the CONHCH$_2$CH$_2$N(C$_2$H$_5$)$_2$ may vary in position and the SC$_2$H$_5$ may vary in position relative to each other and the position of NH$_2$. Also in place of (C$_2$H$_5$), wherever the same appears, other alkyl groups may be substituted therefor. One example of the species group represented by the preceding diagram is:

*Dialkylamino-alkyl amides of 3-amino-4-alkyl-mercapto-benzoic acids*

As representatives of this type there have been prepared the beta-diethylaminoalkyl amide of 3-amino-4-methylmercaptobenzoic, 3-amino-4-ethylmercaptobenzoic and 3-amino-4-propylmercaptobenzoic acids.

A convenient method of preparing compounds of this type depends on the discovery that the chlorine atom of derivatives of 3-nitrochlorobenzoic acid such as its salts, esters and amides can readily be replaced by an alkylmercapto group by treatment with a metal mercaptide, the products being the corresponding derivatives of 3-nitro-4-alkylmercaptobenzoic acids. Subsequently the nitro group may be converted to an amino group by treatment with a reducing agent and the acid derivative group converted to the desired amide group by known procedures, with the provision that in these latter processes, conditions known to be damaging to the alkylmercapto group, such as excessive alkalinity, should be avoided. Reduction of the nitro group to an amino group has been successfully accomplished with a variety of agents known to be capable of producing this transformation in other instances, and a preferred method has been indicated in the examples hereinafter set forth.

Experimentation with a number of known procedures for producing the desired amide grouping has disclosed certain successful examples and one of those found to be most convenient is set forth as follows:

*Diethylaminoethylamide of 3-amino-4-methylmercaptobenzoic acid*

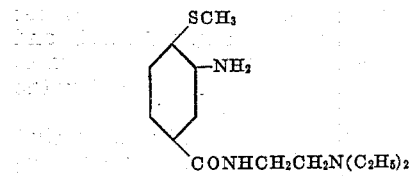

Method I

A solution of the sodium salt of 3-nitro-4-chlorobenzoic acid was prepared by adding 10 grams of sodium bicarbonate and 24.5 grams of 3-nitro-4-chlorobenzoic acid to a mixture of 180 cc. of 95% alcohol and 180 cc. of water. This solution was heated to boiling and mixed with a boiling solution of sodium methyl mercaptide, prepared by bubbling 12 grams of methyl mercaptan slowly into a solution of 4.8 grams of sodium hydroxide in a mixture of 36 cc. of water and 360 cc. of 95% alcohol.

The mixture of these two solutions was boiled for one hour under reflux. The solvent was then removed by distillation under reduced pressure, and the residue, consisting of sodium chloride and the sodium salt of 3-nitro-4-methylmercaptobenzoic acid, was dissolved in the smallest possible amount of warm water. The resulting solution was acidified with concentrated hydrochloric acid, and the 3-nitro-4-methylmercaptobenzoic acid which precipitated was filtered from the solution after thorough cooling. After purification by recrystallization from 95% alcohol, this acid was obtained as a light yellow solid which melted at 240° C.

Ten grams of 3-nitro-4-methylmercaptobenzoic acid was added to 75 cc. of thionyl chloride and the mixture was boiled under reflux, whereupon the acid gradually dissolved. Boiling was continued for thirty minutes after the solution had become clear and the excess thionyl chloride was then removed by distillation under diminished pressure. The solid remaining was recrystallized from high-boiling petroleum ether, and pure 3-nitro-4-methylmercaptobenzoyl chloride was obtained. This substance consists of long, yellow needles which melt at 111° C.

A mixture of 3-nitro-4-methylmercaptobenzoyl chloride and enough methyl alcohol to maintain a clear solution was boiled under reflux until evolution of hydrogen chloride ceased. The solution was then cooled, whereupon crystals of the methyl ester of 3-nitro-4-methylmercaptobenzoic acid separated. This ester is a bright yellow solid which melts at 117° C.

Twenty-five grams of the pure methyl ester of 3-nitro-4-methylmercaptobenzoic acid and 2.5 grams of platinum oxide catalyst (Adams) were suspended in 250 cc. of alcohol and shaken with hydrogen under a pressure of 25 pounds until no further action occurred. The platinum catalyst was filtered from the solution and the alcohol was removed by distillation on the steam bath. The oily residue was then distilled under reduced pressure, and the methyl ester of 3-amino-4-methyl-mercaptobenzoic acid was obtained as a clear yellow oil, which distilled at 170° C. at a pressure of 4 mm. and gradually solidified at room temperature. After purification by recrystallizing from alcohol, the ester consists of white, feathery needles which melt at 61° C.

Three grams of the methyl ester of 3-amino-4-methylmercaptobenzoic acid was dissolved in 2.5 grams of β-diethylamino-ethylamine and placed in a small flask fitted with a short, vertical air condenser, and the mixture was gently refluxed for ten hours. The excess β-diethylaminoethylamine was removed by distillation under diminished pressure. The crude β-diethylaminoethylamide of 3-amino-4-methylmercaptobenzoic acid, which was the desired product and which remained after distillation, was a viscous, yellow oil with no apparent tendency to solidify.

The hydrochloride salt of this amide was produced by taking the product obtained as above and dissolving the same in the smallest possible amount of dry ether while cooled to 0° C. Approximately three molecular proportions of dry HCl dissolved in 50 cc. of dry ether was added dropwise, and the mixture was shaken during the addition. A gummy, white mixture of monohydrochloride and dihydrochloride precipitated. The lumps of this product from time to time were broken up with a stirring rod. After the addition of HCl was complete the reaction mixture was allowed to stand for several days in the refrigerator in order to convert the entire product to the dihydrochloride. When the sticky product had thus solidified, it was filtered from the solution and dissolved in 20 cc. of absolute ethyl alcohol. This alcoholic solution was warmed and small portions of dry ether containing dry HCl were added until the solution became slightly cloudy at the boiling point of the mixed solvent. The pure dihydrochloride of the β-diethylaminoethylamide of 3-amino-4-methylthiobenzoic acid separated on cooling.

Since it is quite hygroscopic, it was triturated with dry ether immediately after filtering and transferred to an Abderhalden dryer.

This dihydrochloride is a white crystalline solid which melts from 196° to 200° C. The actual yield, in one instance, was 3.25 grams or 84% of the theoretical yield. Upon analysis the product was found to contain 11.93% of nitrogen, whereas the theoretical nitrogen content at $C_{14}H_{25}ON_3SCl_2$ was 11.86%.

The ethylmercapto and the n-propylmercapto homologs can be prepared in a similar manner, using ethyl mercaptan for n-propyl mercaptan, respectively, in place of methyl mercaptan and as outlined initially herein for the production of the named amide and its dihydrochloride.

The products obtained in the different steps of these two procedures have the following physical constants: 3-nitro-4-ethylmercaptobenzoic acid, M. P. 231° C.; 3-nitro-4-n-propylmercaptobenzoic acid, M. P. 234° C.; the corresponding chlorides, M. P. 102° C., and 94° C., respectively; the methyl esters, M. P. 130° C. and 97° C., respectively; the methyl ester of 3-amino-4-ethylmercaptobenzoic acid, B. P. 180° C. at 4 mm.; the methyl ester of 3-amino-4-n-propylmercaptobenzoic acid, B. P. 182° at 6 mm.; the corresponding beta-diethylaminoethyl amide dihydrochlorides M. P. 149–151° C. and 145–149° C. respectively: in both cases the free amides were again oils, which did not crystallize.

Method II

A solution of 2.1 grams of the methyl ester of 3-nitro-4-chlorobenzoic acid in 30 cc. of 95% alcohol was heated to boiling and added to a boiling solution of sodium methyl mercaptide, prepared by bubbling one gram of methyl mercaptan slowly into a solution of 0.4 gram of sodium hydroxide in a mixture of 3 cc. of water and 30 cc. of 95% alcohol. The total mixture was boiled under reflux for thirty minutes. The solvent was then removed by distillation under diminished pressure and the solid residue was washed with 15 cc. of water containing a drop of hydrochloric acid. The product, the methyl ester of 3-nitro-4-methylmercaptobenzoic acid, was purified by recrystallization from methyl alcohol.

Further procedure following this method is identical with that applied to the same compound in Method I. Method II, therefore, is an alternative method of preparing the intermediate.

In connection with the beta-diethylaminoethylamide of 3-amino-4-ethylmercaptobenzoic acid used for the production of the dihydrochloride in a similar manner as before mentioned, same produced the corresponding dihydrochloride wherein the actual nitrogen yield was 11.36% compared with the theoretical nitrogen yield of 11.44% and the ionizable chlorine found was 18.80% as compared to the calculated amount of 19.07%.

The beta-diethylaminoethyl amide of 3-amino-4-N-propylmercaptobenzoic acid when used to prepare the dihydrochloride thereof in a comparable manner produced a product which upon analysis was found to contain nitrogen in the amount of 11.09%, whereas the theoretical nitrogen content was 11.02%.

While the invention has been described in great detail in the foregoing specifications the same is to be considered as illustrative only of the general claims and not restrictive in character. Modifications hereof comparable to those disclosed in the earlier Patent No. 2,173,827, as well as in the co-pending application, now Patent No. 2,321,468, as well as others which will readily suggest themselves to persons skilled in this art, are to be considered as within the scope of this invention, reference being had to the appended claims for the definition thereof.

The present disclosure is intended as a basic disclosure of basic compounds previously described and the related compounds which differ in the position of the groups in the benzene ring.

Herein the general disclosure is directed to compounds comprising as a Markush group the amides and the acid addition compounds of said amides and wherein said amides have the general formula, $R'S(NH_2)C_6H_3CONH(CH_2)_xNR''R'''$ where $x$ is an integer greater than unity and less than four and $R'$, $R''$ and $R'''$ represent alkyl radicals of like or unlike character.

The invention claimed is:

1. An organic compound having the formula $$\text{para-}R'S\text{-meta-}NH_2C_6H_3CONH(CH_2)_xNR''R'''$$

where $x$ is an integer greater than one and less than four and $R'$, $R''$ and $R'''$ represent alkyl radicals containing not more than six carbon atoms.

2. β-Diethylaminoethyl amide of 3-amino-4-(n-propylmercapto)benzoic acid.

3. β-Diethylaminoethyl amide of 3-amino-4-(ethylmercapto)benzoic acid.

4. β-Diethylaminoethyl amide of 3-amino-4-(methylmercapto)benzoic acid.

5. The method of preparing a 3-nitro-4-(alkylmercapto)benzoic acid by heating a sodium mercaptide and the sodium salt of a 3-nitro-4-chlorobenzoic acid in aqueous alcohol solution.

JOHN J. DONLEAVY.